Sept. 18, 1956  P. REKETTYE  2,763,031
PROCESS FOR MAKING HOLLOW ARTICLES WITH INSERTS
Filed Aug. 2, 1952  2 Sheets-Sheet 1

*INVENTOR.*
PAUL REKETTYE
BY Ely, Frye & Hamilton
ATTORNEYS

Sept. 18, 1956         P. REKETTYE         2,763,031

PROCESS FOR MAKING HOLLOW ARTICLES WITH INSERTS

Filed Aug. 2, 1952         2 Sheets-Sheet 2

*INVENTOR.*
PAUL REKETTYE
BY Ely, Frye & Hamilton

ATTORNEYS

United States Patent Office 2,763,031
Patented Sept. 18, 1956

2,763,031

PROCESS FOR MAKING HOLLOW ARTICLES WITH INSERTS

Paul Rekettye, Akron, Ohio, assignor to The Sun Rubber Company, Barberton, Ohio, a corporation of Ohio Application August 2, 1952, Serial No. 302,356

3 Claims. (Cl. 18—58.3)

The present invention is directed to a method for manufacturing articles with inserts of various types and, while it is not necessarily limited thereto, it has been perfected in connection with the making of hollow dolls by the process of rotational casting. The specific use shown and described as illustrative of the invention is in the manufacture of dolls having eyes inserted in the heads thereof.

In the process of rotational casting to which the invention is especially adapted, there is provided a hollow sectional mold which is loaded with a charge of a plastisol such as a vinyl-resin compounded with a plasticizer. Plastisols of this type are well known in the art and are available from a number of sources. When the charge has been introduced into the sectional mold, the mold, which is preferably on a conveyer of the type shown in the prior joint application of the present inventor and Henry Martin, Serial No. 179,726, filed August 16, 1950, now Patent No. 2,629,131, February 24, 1953, is closed and locked, and immediately thereafter the mold is rotated simultaneously upon different axes, which will distribute the plastisol evenly over the inner surface of the mold. During rotation, the mold is carried through a heating oven which fuses and sets the plastisol which has been distributed over the interior surface of the mold. After the material is set, the rotation of the mold is stopped and the mold is cooled to a degree where it can be opened and the finished article removed, whereupon the mold repeats the cycle.

As indicated above, the invention is illustrated for the manufacture of dolls having eyes set in sockets prepared for them in the doll, but other inserts may be incorporated in other molded articles by adapting the principles of the invention.

In the drawings, in which the method and apparatus is shown in detail:

Figure 1:
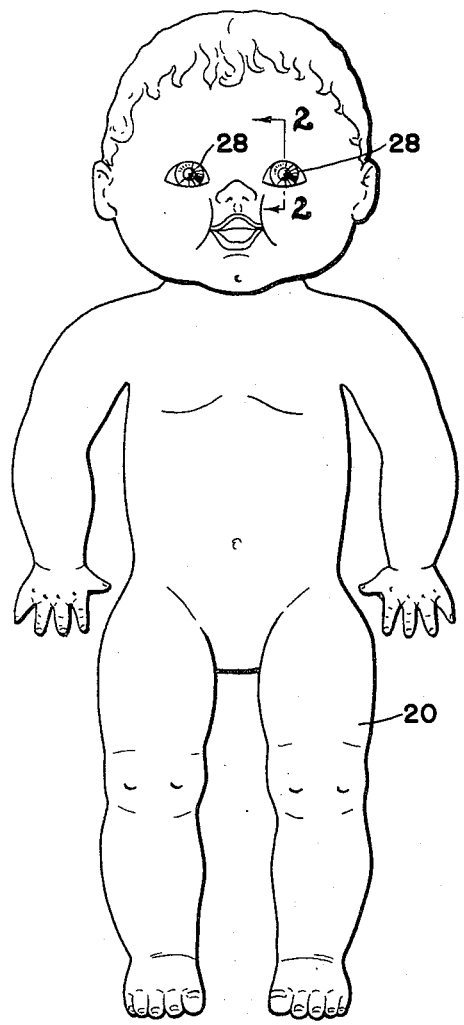
Fig. 1 is a front elevation of a typical doll which has been selected to illustrate the invention, the eyes being in place.

In the drawings the part designated by the numeral 1 is one-half or section of the mold or matrix in which there is the cavity 2, over which the plastisol is distributed, it being understod that there is a second matrix section (not shown) which is closed and locked against the first matrix section in the casting operation.

The setting of eyes in the doll head has been selected as representative of the various uses of the invention. At each location for an eye the matrix section is drilled for the reception of a pin 3. At the point where the pin projects into the cavity of the matrix there is a cone-shaped enlargement or shoulder 4, which fits tightly against the inside wall of the matrix at the socket. The cone-shaped shoulder forms the eye socket of the complete doll. Beyond the part 4 is a shoulder 5 which serves as a rest for the keeper or retainer for the eyes. The inner end of the pin is reduced and tapered so as to allow for easy placement of the keeper.

Each pin 3 is a steel pin, both pins being connected to a plate 7 which extends across the eye sockets in the matrix. On the exterior of the plate 7 is a permanent magnet 8 secured in place on the matrix by bolts 9. This magnet maintains both pins magnetized so that the retainer or keeper will be held on the pins and will not loosen and fall out of place during the casting operation.

Figure 4:
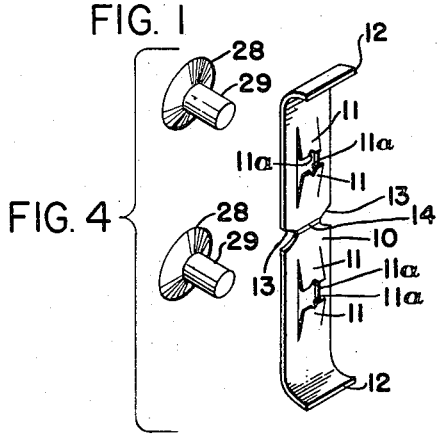
Fig. 4 is a detail of the keeper and the eye separated from the doll.
Figure 6:
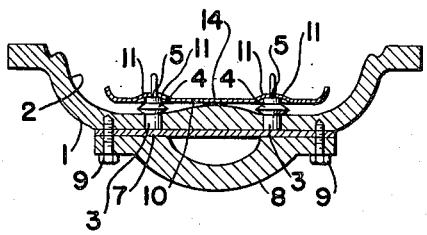
Fig. 6 is an enlarged section on the line 6—6 of Fig. 5.
Figure 5:
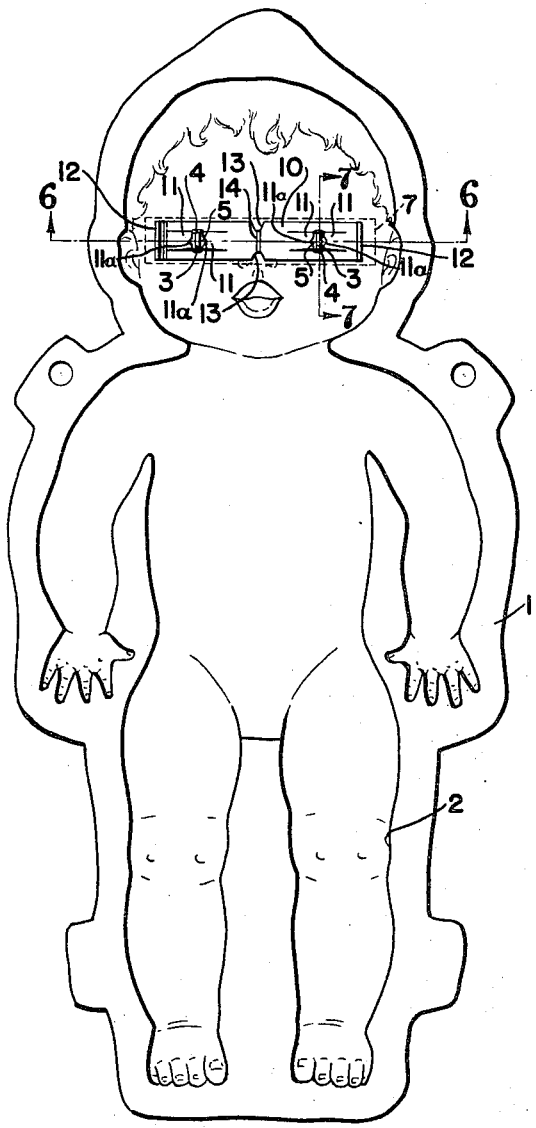
Fig. 5 is a view of one-half of the mold showing the keeper in position.

The retainer or keeper is of any suitable type for the purpose, the essential requirement being that it will retain the eye or eyes in position when the latter are driven into the keeper. There are a number of keepers or retainers which are available for this purpose, the type which is preferable being that shown in the several views, especially Fig. 4. This is a keeper of the so-called "speed-nut" type, as the eye may be driven into it and will be securely retained thereby.

While it is within the scope of the invention to have individual retainers for each eye or each insert, it is preferred to employ a single elongated plate or retainer which extends across the two pins. By making both retainers in a single piece instead of in separate pieces, the job of placing the retainer over the pins is much easier and the workman does not have to handle two small pieces.

The retainer illustrated at 10 is made of a stamping of light spring metal provided with pairs of oppositely facing spring tongues 11 which, when the retainer is in place, project inwardly toward the cavity in the matrix. The opposing ends of each pair of tongues are provided with facing semi-circular recesses 11a so located that when the retainer is placed over the pins 3, the pins will be embraced by the tongues. At each end of the plate is an upturned flange 12 which assists in embedding the plate in the wall of the article. At the central portion of the plate are cut two notches 13 and the metal between the notches is scored as at 14. This weakens the plate at this point so that it is easily broken. Were this provision for weakening the plate not made, after the doll is finished pressure exerted on the side of the head near the eyes would cause the plate to bow outwardly and this would cause the eyes to project out of their sockets. While the plate is placed in position, it is an easy matter for the workman to break the plate along the center line, but if the workman neglects to do this, the plate will break at this point instead of bowing outwardly, which prevents the eyes from being dislocated on the application of pressure to the side of the head.

In operation the retainer is placed over the inwardly projecting ends 14 of the pins 3 where it is held in place by the force of the magnet 8, this operation being performed while the matrix is open and before the charge of casting material is placed therein. After the charge is placed in one matrix section, the matrix is closed and locked and is ready for the subsequent rotation and heat treatment which forms the article.

Figure 7:
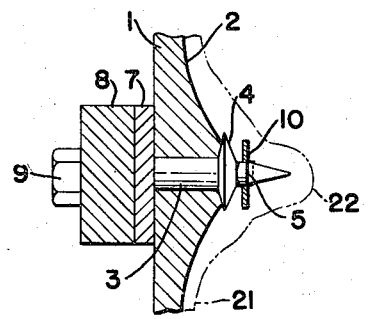
Fig. 7 is a section on the line 7—7 of Fig. 6.

During the rotation of the matrix, the plastisol will be distributed evenly over the inner surface of the matrix and will flow over the inner end of each pin 3 and over the plate thereon, as indicated by the dotted line in Fig. 7, so that when the plastisol has set, the retainer 10 will be embedded in the fused and hardened plastisol.

After the matrix has been cooled sufficiently, the finished article is removed and with it will come the retainer.

Figure 2:
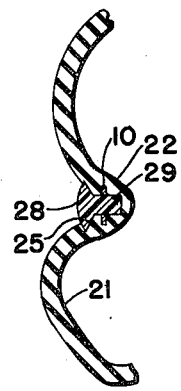
Fig. 2 is a cross-section through the head of the doll at one of the eye sockets.
Figure 3:
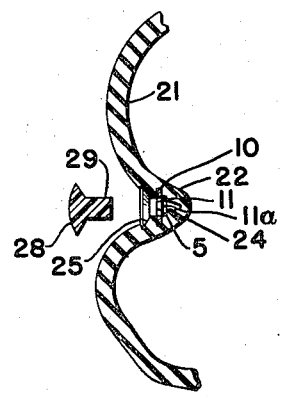
Fig. 3 is a view showing the eyes in the process of insertion.

In Fig. 1 the doll is shown at 20 and in Figs. 2 and 3 the wall of the doll is indicated at 21, that portion of the plastisol which has flowed over and set around a keeper being indicated at 22. The extension of each pin forms a relatively deep recess 24 in each enlargement 22 and the shoulder 4 forms a conical socket 25.

An eye is indicated at 28. This is usually made of glass or similar transparent or semi-transparent material which is colored to represent an eye, the underside of the eye proper being coned to fit the socket 25. A stem 29 projects from the rear side of the eye.

After the doll is removed from the matrix, the eyes are inserted in the sockets, the stems 29 being forced between the tongues 11 which will bite into the material of the stem and securely lock the eyes in position in the sockets.

The provision of means for inserting eyes in dolls made by the rotational casting method is only one aspect of the invention, and the invention is not intended to be restricted to the specific procedure set forth. Whistles, or other noise-making devices and decorative attachments of all kinds may be attached to articles made by the rotational casting method.

While the process is shown and described as especially adapted for the insertion of eyes or other inserts in hollow articles, it may be used in other types of molding and for the manufacture of other articles than dolls or toys. Neither is the invention limited to the process of rotational casting, although it has been adapted and used primarily in that process.

What is claimed is:

1. The process of molding a doll head of a thermo-setting plastic material by rotational casting, said doll head having eyes set in the head, said eyes having reduced inwardly projecting stems, said process comprising the steps of fixing a pin on the interior of the mold at a point where an eye is to be located in the finished head, securing a retainer on said pin and spaced from the inner wall of the mold with a hold sufficient to maintain the retainer in position during the rotational casting operation, said retainer having a locking formation to grip a stem on an eye, flowing the thermo-setting material over and around the retainer while supported on the pin and setting the material so that the retainer is permanently embedded in the head, removing the head from the mold and stripping the retainer from the pin, and inserting the stem of an eye through the hole formed in the article by the pin and into the locking formation by which the stem of the eye is permanently held when the eye is located in the head.

2. The process of molding a doll head of a thermo-setting plastic material by rotational casting, said doll head having eyes set in the head, said eyes having reduced inwardly projecting stems, said process comprising the steps of fixing spaced pins on the interior of the mold at the points where the eyes are to be located in the finished head, securing a retainer on said pins and spaced from the inner wall of the mold with a hold sufficient to maintain the retainer in position during the rotational casting operation, said retainer having locking formations adapted to grip the stems on the eyes, flowing the thermo-setting material over and around the retainer while supported on the pins and setting the material so that the retainer is permanently embedded in the head, removing the head from the mold and stripping the retainer from the pins, and inserting the stems of the eyes through the holes formed in the article by the pins and into the locking formations by which the stems of the eyes are permanently held when the eyes are located in the head.

3. The process of molding an article from a thermo-setting plastic material by rotational casting, said article having an insert permanently located on the exterior of the article, said insert having a reduced inwardly projecting stem, said process comprising the steps of fixing a pin on the interior of the mold where an insert is to be located in the finished article, securing a retainer on the pin with a hold sufficient to maintain the retainer in position during the rotational casting operation, a retainer having a locking formation adapted to grip the stem on the insert, flowing the thermo-setting material over and around the retainer while supported on the pin and setting the material so that the retainer is permanently embedded in the article, removing the article from the mold and stripping the retainer from the pin, and inserting the stem of the insert through the hole formed in the article by the pin and into the locking formation whereby the stem of the insert is permanently held in the article.

References Cited in the file of this patent

UNITED STATES PATENTS

| | | |
|---|---|---|
| 1,999,725 | Grubman | Apr. 30, 1935 |
| 2,181,694 | Felcher | Nov. 28, 1938 |
| 2,425,510 | Cohn | Aug. 12, 1947 |
| 2,465,276 | Ryder | Mar. 22, 1949 |
| 2,511,110 | Huelster | June 13, 1950 |
| 2,629,134 | Molitor | Feb. 24, 1953 |